(12) United States Patent
Malvankar et al.

(10) Patent No.: US 12,111,820 B2
(45) Date of Patent: Oct. 8, 2024

(54) ENSURING SECURE PROVISIONING OF BLOCKCHAIN INFRASTRUCTURE

(71) Applicant: International Business Machines Corporation, Armonk, NY (US)

(72) Inventors: Abhishek Malvankar, White Plains, NY (US); Jeronimo Irazabal, Roque Pérez (AR); Nitin Gaur, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 17/019,542

(22) Filed: Sep. 14, 2020

(65) Prior Publication Data

US 2022/0083537 A1 Mar. 17, 2022

(51) Int. Cl.
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 8,924,950 B2 | 12/2014 | McDonald et al. | |
| 9,847,964 B2 | 12/2017 | Logue | |
| 9,967,334 B2 | 5/2018 | Ford | |
| 10,489,357 B2 | 11/2019 | Horowitz et al. | |
| 10,541,886 B2 | 1/2020 | Bathen et al. | |
| 10,560,268 B2 | 2/2020 | Eshwar et al. | |
| 11,182,403 B2 * | 11/2021 | Aseev | H04L 9/3239 |
| 2014/0123123 A1 | 5/2014 | Bahls | |
| 2018/0039667 A1 * | 2/2018 | Pierce | H04L 9/3247 |
| 2018/0101842 A1 * | 4/2018 | Ventura | G06Q 10/087 |
| 2018/0349621 A1 | 12/2018 | Schvey et al. | |
| 2019/0043050 A1 * | 2/2019 | Smith | H04W 56/001 |
| 2019/0163912 A1 * | 5/2019 | Kumar | H04L 9/0891 |
| 2019/0332702 A1 * | 10/2019 | Manamohan | G06F 11/3006 |
| 2019/0392061 A1 * | 12/2019 | Terry | G06F 16/2365 |
| 2020/0090188 A1 * | 3/2020 | Wince | H04L 9/3247 |
| 2020/0162238 A1 | 5/2020 | Yoon et al. | |

(Continued)

FOREIGN PATENT DOCUMENTS

| | | |
|---|---|---|
| CN | 101263521 A | 9/2008 |
| CN | 110741372 A | 1/2020 |

(Continued)

OTHER PUBLICATIONS

International Search Report and Written Opinion, International Application No. PCT/CN2021/118004, Nov. 25, 2021, 8 pgs.

(Continued)

*Primary Examiner* — Kris E Mackes
*Assistant Examiner* — Cao D Vuong
(74) *Attorney, Agent, or Firm* — Eric W. Chesley

(57) ABSTRACT

A plurality of ledger nodes within a blockchain infrastructure is continuously updated via a set of conduit nodes. The set of conduit nodes share a secure provision ledger. The secure provision ledger includes a set of updates for the blockchain infrastructure. Each conduit node within the set propagates the set of updates to a subset of the plurality of ledger nodes.

20 Claims, 6 Drawing Sheets

(56) References Cited

U.S. PATENT DOCUMENTS

2020/0228316 A1* 7/2020 Cahill ................. H04L 9/0637
2020/0278963 A1   9/2020 Destefanis et al.
2021/0067536 A1* 3/2021 Mylrea ................ H04L 9/3239

FOREIGN PATENT DOCUMENTS

| CN | 110870254 A | 3/2020 | | |
|----|-------------|--------|----|----|
| DE | 20200100126 A1 | 5/2020 | | |
| KR | 20190100177 A | 8/2019 | | |
| WO | WO-2017143435 A1 * | 8/2017 | ............. | G06F 16/27 |

OTHER PUBLICATIONS

Han et al. "Sensor network software update management: a survey", International Journal of Network Management 15.4 (2005), 12 pages.

Feibelman, "An Enterprise Blockchain Solution for an Infrastructure-as-a-Service Platform", An Enterprise Blockchain Solution for an IaaS Platform, Dec. 12, 2019, 13 pages. https://www.cse.wustl.edu/~jain/cse570-19/ftp/blc_iaas/index.html.

"Amazon Managed Blockchain", AWS, Copyright 2020, printed Jun. 22, 2020, 11 pages. https://aws.amazon.com/managed-blockchain/.

Nastic et al., "A Middleware Infrastructure for Utility-based Provisioning of IoT Cloud Systems", Distributed Systems Group, TU Wien, Austria, 13 pages. https://dsg.tuwien.ac.at/team/truong/publications/2016/truong-sec2016.pdf.

Dudka "Blockchain Infrastructure Thesis", Staking Rewards, Oct. 2, 2019, 30 pages. https://www.stakingrewards.com/journal/research/blockchain-infrastructure-thesis.

Mell et al., "The NIST Definition of Cloud Computing", Recommendations of the National Institute of Standards and Technology, Special Publication 800-145, Sep. 2011, 7 pages.

* cited by examiner

ENSURING SECURE PROVISIONING OF BLOCKCHAIN INFRASTRUCTURE

BACKGROUND

The present disclosure relates generally to the field of blockchain infrastructure, and more particularly to ensuring secure provisioning of blockchain infrastructure.

Blockchain generally refers to a shared, immutable ledger that facilitates the recording of transactions and processes (e.g., asset and currency tracking within business networks). Implementation of blockchain infrastructures are becoming increasingly widespread, and new and useful applications for blockchain are constantly being developed.

SUMMARY

Embodiments of the present disclosure include a method, computer program product, and system for enhancing the security of a blockchain infrastructure.

A plurality of ledger nodes within a blockchain infrastructure is continuously updated via a set of conduit nodes. The set of conduit nodes share a secure provision ledger. The secure provision ledger includes a set of updates for the blockchain infrastructure. Each conduit node within the set propagates the set of updates to a subset of the plurality of ledger nodes.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
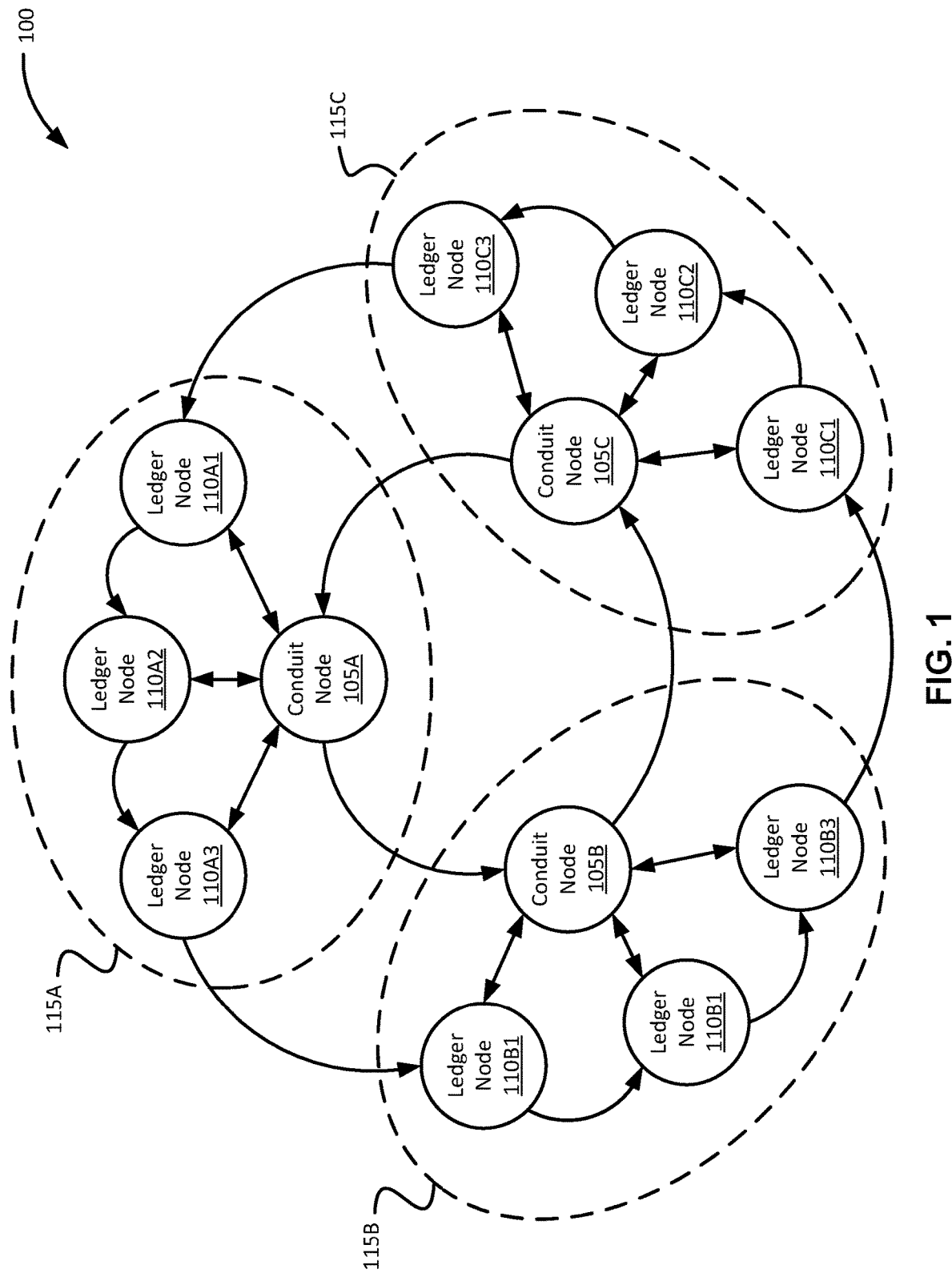
FIG. 1 illustrates an example computing environment for blockchain infrastructure, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of blockchain infrastructure, and more particularly to ensuring secure provisioning of blockchain infrastructure. While the present disclosure is not necessarily limited to such applications, various aspects of the disclosure may be appreciated through a discussion of various examples using this context.

As blockchain networks grow, ensuring that the provisioning of blockchain resources is secure, consistent, and extensible is a significant concern. This may apply to both permissioned and permission-less blockchain networks. Developers and administrators may be concerned with ensuring that the latest and most secure software, hardware, and core code is included or utilized in the virtual machines, containers, or other units of the blockchain infrastructure.

Traditionally, network administrators maintain security and consistency through periodic security updates (e.g., in a permissioned blockchain), or by penalizing the owner/operator of a particular node/container (e.g., in a permission-less blockchain) in some way to incentivize consistency with other nodes/containers.

Because security vectors shift rapidly, operating system (OS) providers, container providers, and cloud computing providers may constantly issue updates for runtime and the container stacks. Preventing weak points, such as nodes and containers with less secure software/updates/code running thereon, enhances the immutable nature of the architecture by increasing security and streamlining compatibility among the blockchain infrastructure components.

Embodiments of the present disclosure contemplate a method and model to ensure the secure and extensible provisioning of blockchain infrastructure. Traditional blockchain models are typically only updated periodically, for example upon the authentication of a new transaction. A continuous update model, however, may employ a specialized, shared secure provision ledger to keep a record of updates to the blockchain infrastructure. The shared secure provision ledger may be shared among specialized conduit nodes, which may in turn propagate the recorded update requirements to ledger nodes of a blockchain. In some embodiments, each entity participating in the blockchain may employ a conduit node to manage the shared secure provision ledger and propagate updates to the one or more ledger nodes utilized/owned by the entity. In this way, various enterprises/entities may participate in a blockchain network while ensuring both their own ledger nodes and the ledger nodes of their blockchain peers all comply with a ubiquitous standard for software/hardware/firmware/etc. security updates.

In some embodiments, an entity may be a unique enterprise; however, in some embodiments, an entity may be an organization within a unique enterprise (e.g., a division, department, etc.).

In some embodiments, the shared secure provision ledger may enforce a definitive standard (e.g., prescribe particular versions for software/hardware/OS/firmware/etc.) or a minimum standard (e.g., prescribe version X, or newer). In the event that the resource(s) used to embody a particular conduit or ledger node are unable to comply with the standard, that/those node(s) may be denied registration into the blockchain network. In some embodiments, a tolerance period may be employed. A tolerance period may include the amount of time a component of a blockchain network has to execute an update and become compliant with the standard in the shared secure provision ledger.

In this way, cross-entity blockchain networks may employ decentralized, continuously available, and immutable security standards for their infrastructure components, and each entity may be assured that every other entity maintains that same level of security.

Referring now to FIG. 1, depicted is an example computing environment 100 for blockchain infrastructure, in accordance with embodiments of the present disclosure. In this example, three separate entities maintain their own sections 115A-C of a blockchain network. In some embodiments, sections 115A-C may all reside on the same server, across multiple servers, in the same cloud environment, or in separate cloud environments.

Each section 115A-C may contain at least one conduit node 105A-C. The conduit nodes 105A-C may, as discussed herein, share a specialized secure provision ledger to maintain a record of security standards for provisioning the components of the blockchain network of ledger nodes 110A1-3, 110B1-3, and 110C1-3. In some embodiments, KUBERNETES architecture may be employed to manage the shared secure provision ledger among the conduit nodes 105A-C.

The shared secure provision ledger may be updated by consensus among the conduit nodes 105A-C and may further contain the security standards for the ledger nodes 110A1-3, 110B1-3, and 110C1-3. Each conduit node 105A-C may communicate and govern the provisioning of the ledger nodes within the associated section 115A-C of the blockchain network. For example, conduit node 105A may propagate the security standards within the shared secure provisioning ledger to ledger nodes 110A1-3 and decommission any ledger node that cannot comply with those security standards. In some embodiments, the shared secure provision ledger may dictate a minimum standard of security for the entire blockchain network, and each conduit node 105A-C may further include additional security standards for the ledger nodes 110A1-110C3 within their respective sections 115A-C. In some embodiments, conduit nodes 105A-C may propagate both sets of security standards to their respective ledger nodes 110A1-110C3 using parallel techniques, such as Single Instruction Multiple Data (SIMD) techniques.

In some embodiments, the decommissioning of a ledger node may include creating an image or snapshot of the ledger information within that node, identify a new ledger node (or, in some embodiments, generate a new container) capable of complying with the security standards, and installing the image/snapshot onto the new ledger node/container. In some embodiments, the new ledger node/container may be tested in order to ensure compliance prior to registration and incorporation into the blockchain network.

Ledger nodes 110A1-110C3 may employ an immutable shared ledger to track an asset or other objects/resources among the various other ledger nodes 110A1-110C3 of the blockchain network.

It should be appreciated by one having skill in the art that while this example depicts three sections 115A-C, three conduit nodes 105A-C and three sets of ledger nodes 110A1-110C3, any number of sections, conduit nodes, and ledger nodes may be employed. The example given here should not be construed as limiting the number of components (e.g., nodes/containers/sections) in any way.

Figure 2:
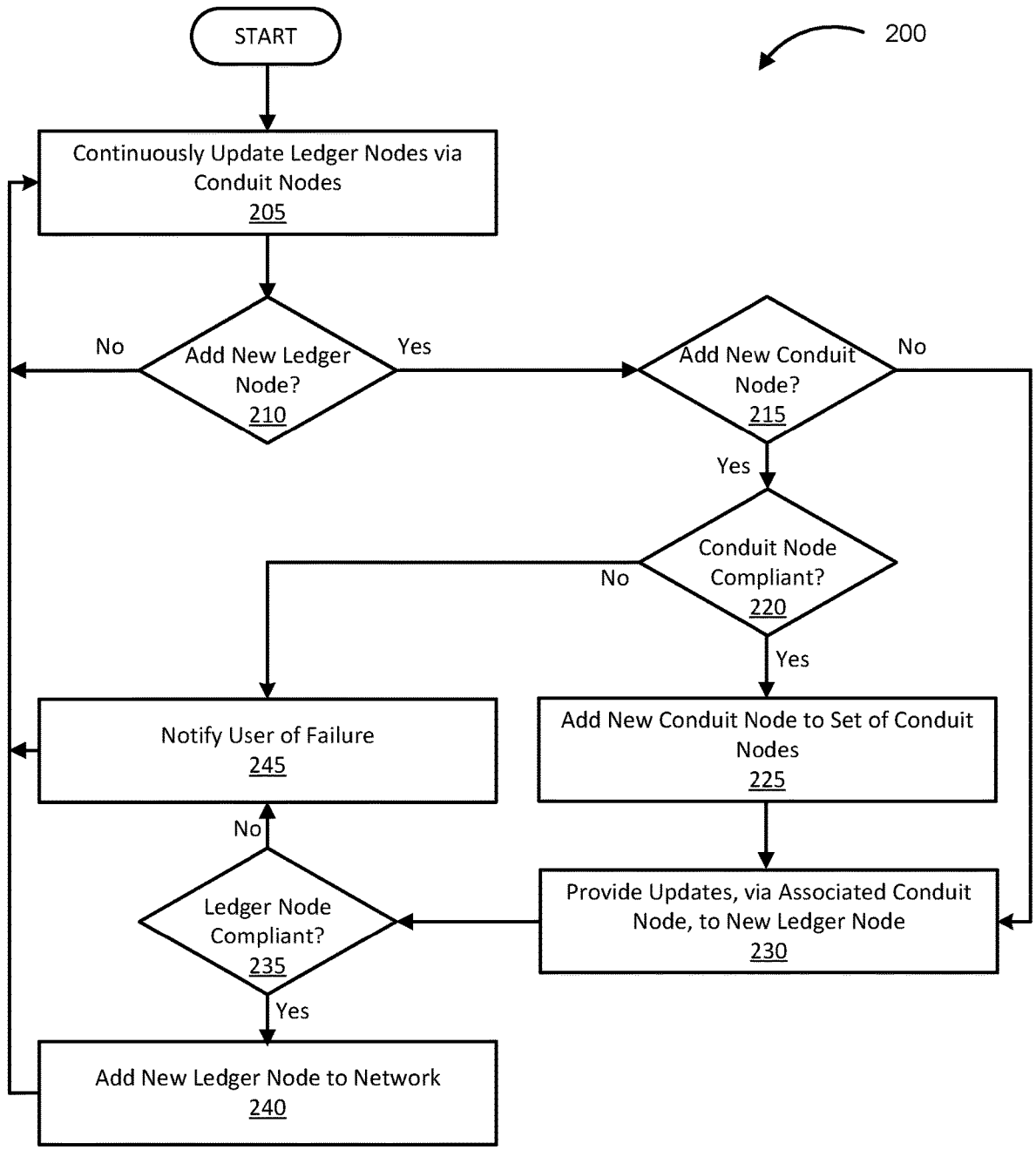
FIG. 2 illustrates an example method for ensuring secure provisioning of blockchain infrastructure, in accordance with embodiments of the present disclosure.

Referring now to FIG. 2, illustrated is an example method 200 for ensuring secure provisioning of blockchain infrastructure, in accordance with embodiments of the present disclosure. Example method 200 may begin at 205, where ledger nodes are continuously updated via conduit nodes. In some embodiments, this may include updates regarding OS, hardware, software, firmware, or any other security-related aspect of a blockchain network component.

At 210, it is determined whether a new ledger node will be added to the blockchain network. If yes, then it is determined, at 215, whether a new conduit node will also be added to the blockchain infrastructure (e.g., if a new entity will be participating in the blockchain). If a conduit node will not be added, the method proceeds to 230.

If, at 215, it is determined a new conduit node will be added to the blockchain, the conduit node is checked for compliance with the standards in the shared secure provisioning ledger at 220. If, at 220, the conduit node fails the compliance check, the user attempting to add the ledger and conduit nodes is notified of the failure at 245.

If, however, the conduit node passes the compliance check at 220, the new conduit node is added to the set of conduit nodes within the blockchain infrastructure, and begins participating in/sharing the secure provision ledger with any pre-existing conduit node(s) at 225.

At 230, the new ledger node is provided, via the conduit node associated with the ledger node, with any updates required to achieve compliance with the shared secure provision ledger.

At 235, the new ledger node is checked for compliance. The compliance check may include, for example, matching or checking versions of software/hardware/firmware against the standard within the shared secure provision ledger.

If, at 235, it is determined the new ledger node is not compliant, the user attempting to add the ledger node is notified of the failure at 245, and the new ledger node is denied registration on the blockchain network.

If, however, it is determined at 235 the new ledger node is in compliance with the standard(s) in the shared secure provision ledger, the new ledger node is added to the blockchain network at 240. In this way, a unified security standard may be employed and propagated across all nodes and entities participating in a blockchain network.

Figure 3:
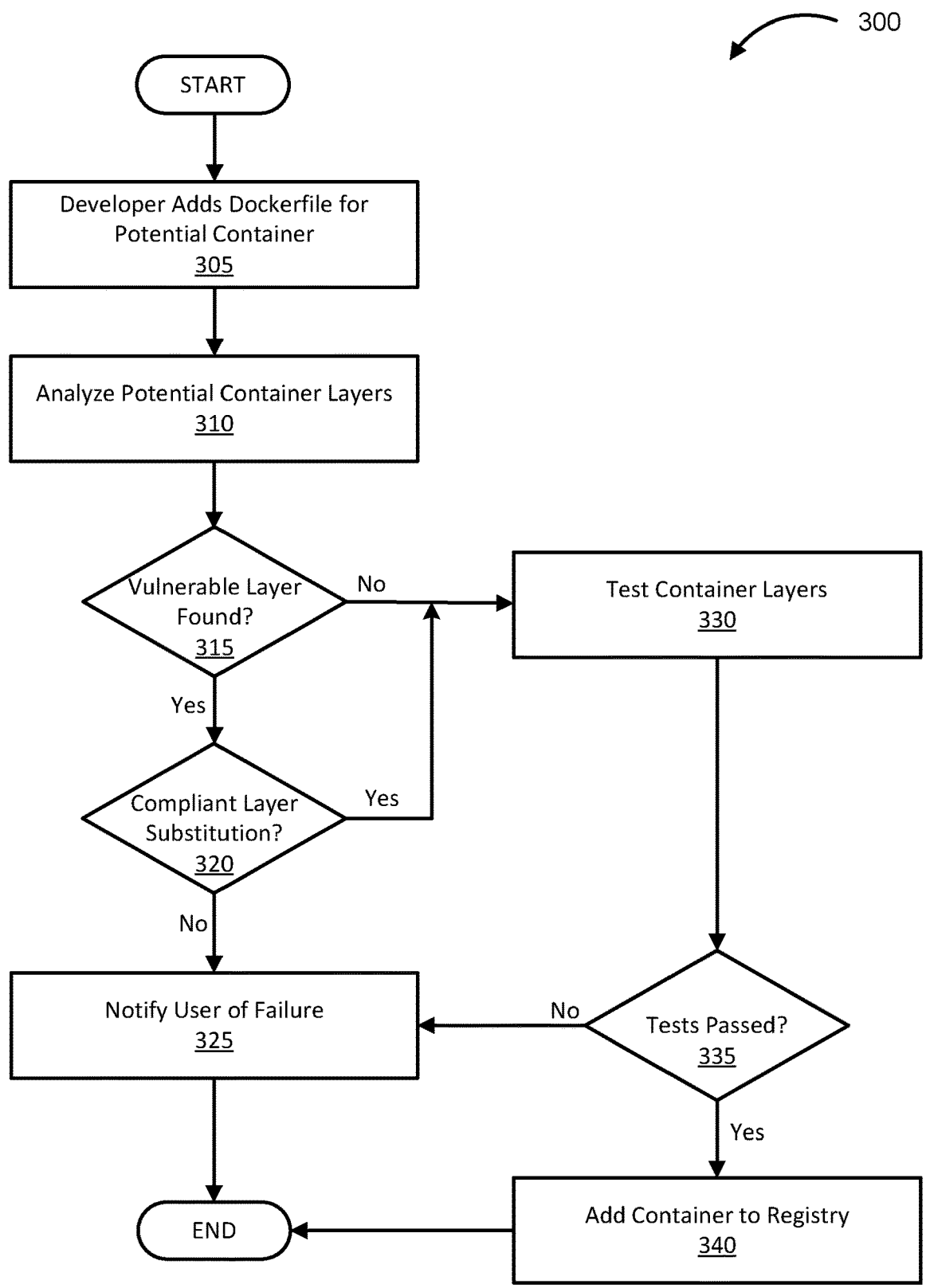
FIG. 3 illustrates an example method for ensuring secure provisioning of containers, in accordance with embodiments of the present disclosure.

Referring now to FIG. 3, illustrated is an example method 300 for ensuring secure provisioning of containers, in accordance with embodiments of the present disclosure. In some embodiments, KUBERNETES architecture may be used between conduit nodes and ledger nodes to ensure compliance with a blockchain network policy, such as a security standard prescribed within a shared secure provision ledger, as described herein.

Method 300 may begin at 305, where a developer/user adds a Dockerfile for a potential KUBERNETES container to be added to a blockchain network (e.g., as a ledger node). In some embodiments, the Dockerfile may contain information, such as container layer version and a specification or policy for determining when a container, or layer within a container, should be replaced to enhance the security of the container.

At 310, the potential container layers are analyzed using the Dockerfile. In some embodiments, various policies may be defined. For example, a policy where if any vulnerability is found within a layer of a container, that layer should be upgraded or, if unable to be upgraded, the container may be replaced with a compliant container.

At 315, if a vulnerable layer is found, a compliant layer is substituted, or the vulnerable layer may be upgraded, at 320. In some embodiments, peers within the blockchain network may perform a check/test, at 330, to determine whether the layer or container has been replaced and/or has become compliant. For example, the replaced layer may be tested against existing continuous integration and continuous delivery (CI/CD) DevOps systems.

In some embodiments, a layer replacement (e.g., step 320) may be implemented using a Dockerfile and the instructions for LABEL, MAINTAINER, and ONBUILD. For example, the LABEL instruction may add metadata to a container image. A LABEL may be, for example, a key-value pair which can be used to handle the layer replacement when a vulnerability is detected (e.g., VULNERABILITY_DETECTED=ANY).

In some embodiments, the MAINTAINER instruction may set the author field of the generated image, in order to specify the user/developer to be notified of the vulnerability and/or layer replacement (e.g., MAINTAINER=JOHN_DOE@DOCKERFILE.COM).

In some embodiments, the ONBUILD instruction may add a trigger instruction for execution at a time when the image is used as a base for another build (e.g., replacement layer/container). In some embodiments, this may be used to replace base layers as well as execute tests when an image is used in building a replacement layer/container, in addition to providing a trigger to notify the author specified.

If, however, there was no layer substitution/upgrade prior to the check/test, the user, or developer, may be notified of the failure at 325. Similarly, if the container layers fail the testing performed at 330, a check to determine pass/fail of the test, at 335, may prompt the user/developer to be notified at 325.

If, however, the test pass/fail check is passed at 335, the container may be added to the blockchain network registry at 340.

It is to be understood that although this disclosure includes a detailed description on cloud computing, implementation of the teachings recited herein are not limited to a cloud computing environment. Rather, some embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
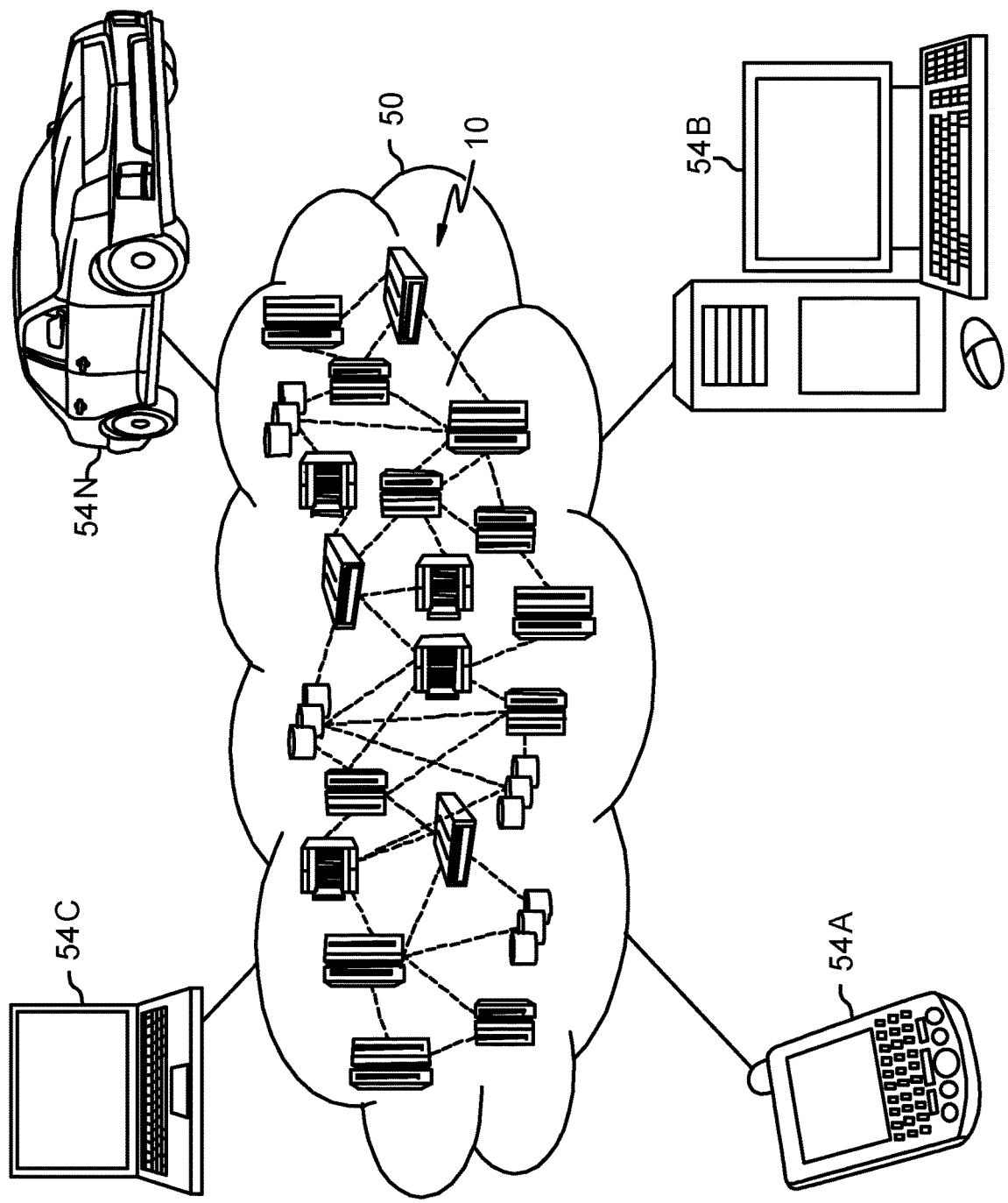
FIG. 4 depicts a cloud computing environment according to an embodiment of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
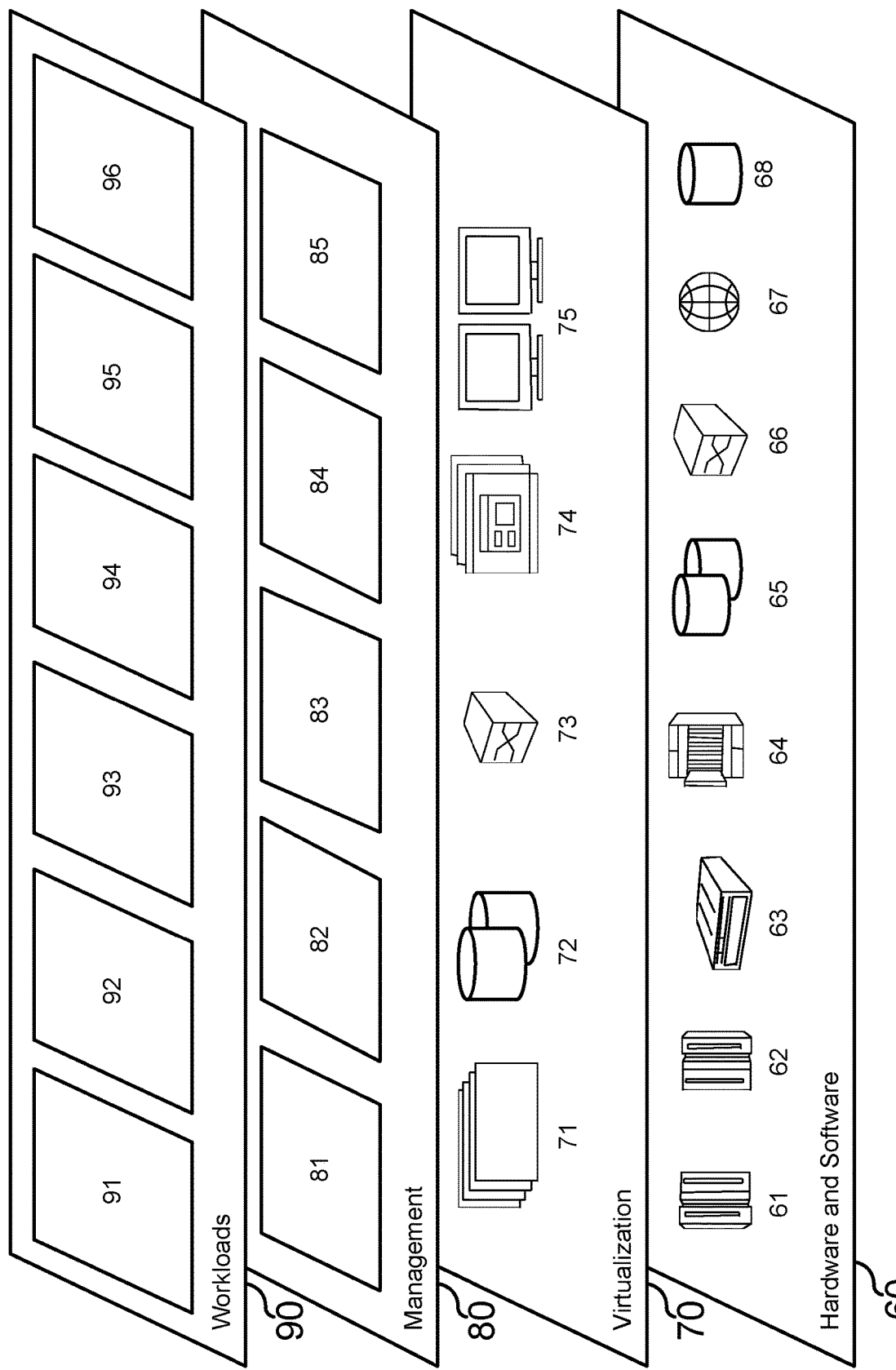
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and some embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ensuring secure provisioning of blockchain infrastructure 96.

Figure 6:
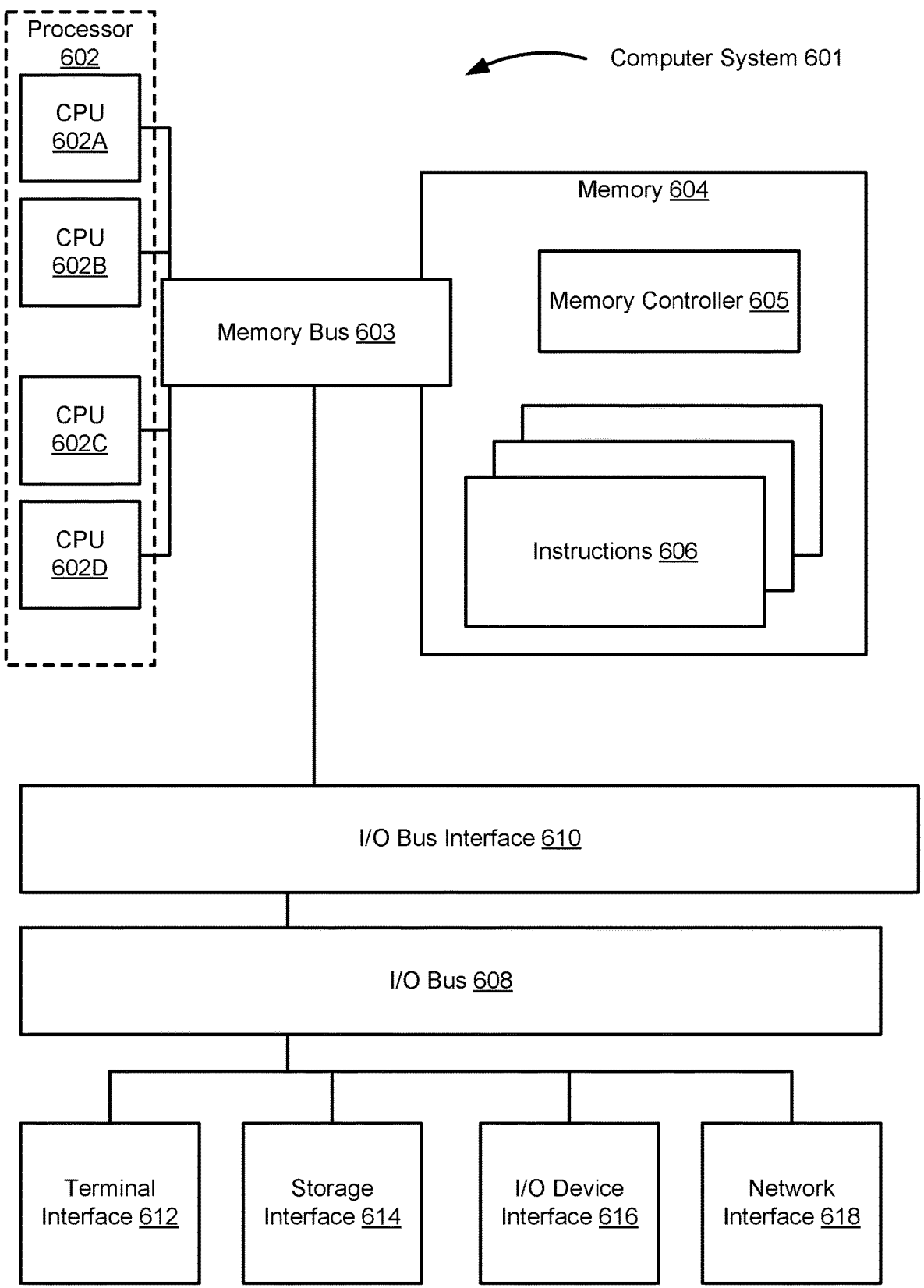
FIG. 6 depicts a high-level block diagram of an example computer system that may be used in implementing embodiments of the present disclosure.

Referring now to FIG. 6, shown is a high-level block diagram of an example computer system 601 that may be configured to perform various aspects of the present disclosure, including, for example, methods 200/300, described in FIGS. 2 and 3. The example computer system 601 may be used in implementing one or more of the methods or modules, and any related functions or operations, described herein (e.g., using one or more processor circuits or computer processors of the computer), in accordance with embodiments of the present disclosure. In some embodiments, the illustrative components of the computer system 601 comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache. Memory subsystem 604 may include instructions 606 which, when executed by processor 602, cause processor 602 to perform some or all of the functionality described above with respect to FIGS. 2-3.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601 and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 604 may contain elements for control and flow of memory used by the CPU 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative example components of an exemplary computer system 601. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enhancing security of a blockchain infrastructure, the method comprising:
   continuously updating a plurality of ledger nodes within the blockchain infrastructure via a set of conduit nodes,
      wherein each conduit node within the set of conduit nodes shares a secure provision ledger with at least one other conduit node in the set of conduit nodes,
      wherein the secure provision ledger includes a set of prescribed security updates for the blockchain infrastructure,
      wherein each conduit node within the set of conduit nodes propagates the set of prescribed security updates to a subset of the plurality of ledger nodes to advise the subset of the plurality of ledger nodes to install the prescribed security updates, and
      wherein each conduit node within the set of conduit nodes enforces compliance with the set of prescribed security updates by performing a compliance check of the subset of the plurality of ledger nodes to determine that the subset of the plurality of ledger nodes have installed the set of prescribed security updates.

2. The method of claim 1, further comprising:
   determining a new ledger node will be added to the blockchain infrastructure, wherein the new ledger node is associated with a first conduit node;
   providing, via the first conduit node, the set of prescribed security updates for the blockchain infrastructure to the new ledger node;
   determining the new ledger node has applied the set of prescribed security updates; and
   adding the new ledger node to the blockchain infrastructure.

3. The method of claim 1, further comprising:
   determining a new ledger node will be added to the blockchain infrastructure, wherein the new ledger node is associated with a new conduit node;
   confirming the new conduit node complies with the set of prescribed security updates for the blockchain infrastructure;
   adding the new conduit node to the set of conduit nodes within the blockchain infrastructure, the new conduit node including the secure provision ledger;
   providing, via the new conduit node, the set of prescribed security updates for the blockchain infrastructure to the new ledger node;
   determining the new ledger node has applied the set of prescribed security updates; and
   adding the new ledger node to the blockchain infrastructure.

4. The method of claim 1, further comprising:
   determining one or more ledger nodes within the plurality of ledger nodes fail to comply with one or more prescribed security updates; and
   decommissioning the one or more ledger nodes from the blockchain infrastructure.

5. The method of claim 4, wherein decommissioning the one or more ledger nodes further comprises:
   identifying a new ledger node, the new ledger node complying with the set of prescribed security updates;
   generating a snapshot of a set of blockchain information associated with the one or more ledger nodes;
   replicating, on the new ledger node, the snapshot; and
   adding the new ledger node to the blockchain infrastructure.

6. The method of claim 5, wherein each conduit node within the set of conduit nodes is owned by a unique entity.

7. The method of claim 1, wherein software is provided as a service in a cloud environment to provision the blockchain infrastructure.

8. The method of claim 1, wherein the set of prescribed security updates includes one or more updates selected from the group consisting of:
   a software version update;
   a hardware update;
   a firmware update;
   a core code update for a virtual machine;
   a core code update for a container; and
   a security standards update.

9. The method of claim 1, wherein the secure provision ledger includes a record of updates made to the blockchain infrastructure, the record of updates including one or more security standards for provisioning components of the blockchain infrastructure.

10. A computer program product for enhancing security of a blockchain infrastructure, the computer program product comprising a computer readable storage medium having program instructions embodied therewith, the program instructions executable by a device to cause the device to:
   continuously update a plurality of ledger nodes within the blockchain infrastructure via a set of conduit nodes,
      wherein each conduit node within the set of conduit nodes shares a secure provision ledger with at least one other conduit node in the set of conduit nodes,
      wherein the secure provision ledger includes a set of prescribed security updates for the blockchain infrastructure,
      wherein each conduit node within the set of conduit nodes propagates the set of prescribed security updates to a subset of the plurality of ledger nodes to advise the subset of the plurality of ledger nodes to install the prescribed security updates, and
      wherein each conduit node within the set of conduit nodes enforces compliance with the set of prescribed security updates by performing a compliance check of the subset of the plurality of ledger nodes to determine that the subset of the plurality of ledger nodes have installed the set of prescribed security updates.

11. The computer program product of claim 10, wherein the program instructions further cause the device to:
determine a new ledger node will be added to the blockchain infrastructure, wherein the new ledger node is associated with a first conduit node;
provide, via the first conduit node, the set of prescribed security updates for the blockchain infrastructure to the new ledger node;
determine the new ledger node has applied the set of prescribed security updates; and
add the new ledger node to the blockchain infrastructure.

12. The computer program product of claim 10, wherein the program instructions further cause the device to:
determine a new ledger node will be added to the blockchain infrastructure, wherein the new ledger node is associated with a new conduit node;
confirm the new conduit node complies with the set of prescribed security updates for the blockchain infrastructure;
add the new conduit node to the set of conduit nodes within the blockchain infrastructure, the new conduit node including the secure provision ledger;
provide, via the new conduit node, the set of prescribed security updates for the blockchain infrastructure to the new ledger node;
determine the new ledger node has applied the set of prescribed security updates; and
add the new ledger node to the blockchain infrastructure.

13. The computer program product of claim 10, wherein the program instructions further cause the device to:
determine one or more ledger nodes within the plurality of ledger nodes fail to comply with one or more prescribed security updates; and
decommission the one or more ledger nodes from the blockchain infrastructure.

14. The computer program product of claim 13, wherein decommissioning the one or more ledger nodes further comprises:
identifying a new ledger node, the new ledger node complying with the one or more new updates;
generating a snapshot of a set of blockchain information associated with the one or more ledger nodes;
replicating, on the new ledger node, the snapshot; and
adding the new ledger node to the blockchain infrastructure.

15. The computer program product of claim 14, wherein each conduit node within the set of conduit nodes is owned by a unique entity.

16. A system for enhancing security of a blockchain infrastructure, the system comprising:
a memory subsystem, with program instructions included thereon; and
a processor in communication with the memory subsystem, wherein the program instructions cause the processor to:
continuously update a plurality of ledger nodes within the blockchain infrastructure via a set of conduit nodes,
wherein each conduit node within the set of conduit nodes shares a secure provision ledger with at least one other conduit node in the set of conduit nodes,
wherein the secure provision ledger includes a set of prescribed security updates for the blockchain infrastructure,
wherein each conduit node within the set of conduit nodes propagates the set of prescribed security updates to a subset of the plurality of ledger nodes to advise the subset of the plurality of ledger nodes to install the prescribed security updates, and
wherein each conduit node within the set of conduit nodes enforces compliance with the set of prescribed security updates by performing a compliance check of the subset of the plurality of ledger nodes to determine that the subset of the plurality of ledger nodes have installed the set of prescribed security updates.

17. The system of claim 16, wherein the program instructions further cause the processor to:
determine a new ledger node will be added to the blockchain infrastructure, wherein the new ledger node is associated with a first conduit node;
provide, via the first conduit node, the set of prescribed security updates for the blockchain infrastructure to the new ledger node;
determine the new ledger node has applied the set of prescribed security updates; and
add the new ledger node to the blockchain infrastructure.

18. The system of claim 16, wherein the program instructions further cause the processor to:
determine a new ledger node will be added to the blockchain infrastructure, wherein the new ledger node is associated with a new conduit node;
confirm the new conduit node complies with the set of prescribed security updates for the blockchain infrastructure;
add the new conduit node to the set of conduit nodes within the blockchain infrastructure, the new conduit node including the secure provision ledger;
provide, via the new conduit node, the set of prescribed security updates for the blockchain infrastructure to the new ledger node;
determine the new ledger node has applied the set of prescribed security updates; and
add the new ledger node to the blockchain infrastructure.

19. The system of claim 16, wherein the program instructions further cause the processor to:
determine one or more ledger nodes within the plurality of ledger nodes fail to comply with one or more prescribed security updates; and
decommission the one or more ledger nodes from the blockchain infrastructure.

20. The system of claim 19, wherein decommissioning the one or more ledger nodes further comprises:
identifying a new ledger node, the new ledger node complying with the set of prescribed security updates;
generating a snapshot of a set of blockchain information associated with the one or more ledger nodes;
replicating, on the new ledger node, the snapshot; and
adding the new ledger node to the blockchain infrastructure.

* * * * *